United States Patent
Marius

(10) Patent No.: US 10,209,137 B1
(45) Date of Patent: Feb. 19, 2019

(54) MEASURING TEMPERATURE IN AN ELECTRIC MOTOR

(71) Applicant: Kitty Hawk Corporation, Mountain View, CA (US)

(72) Inventor: Diederik Marius, Mountain View, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/853,387

(22) Filed: Dec. 22, 2017

(51) Int. Cl.
| | |
|---|---|
| *G01K 7/36* | (2006.01) |
| *G01K 13/04* | (2006.01) |
| *G01K 13/08* | (2006.01) |
| *G01N 3/56* | (2006.01) |
| *G01K 7/20* | (2006.01) |
| *G01K 7/16* | (2006.01) |
| *H02K 15/04* | (2006.01) |
| *H02K 11/25* | (2016.01) |
| *G01K 1/20* | (2006.01) |

(52) U.S. Cl.
CPC .............. *G01K 7/16* (2013.01); *H02K 11/25* (2016.01); *H02K 15/04* (2013.01); *G01K 1/20* (2013.01)

(58) Field of Classification Search
CPC .......... G01K 7/36; G01K 13/04; G01K 13/08; G01K 13/00; G01K 7/00; G01K 7/20; G01N 2203/0635; G01N 3/56
USPC ....... 374/141, 144, 163, 152, 179, 183, 153, 374/185
See application file for complete search history.

(56) References Cited

U.S. PATENT DOCUMENTS

| | | | | |
|---|---|---|---|---|
| 2,674,705 | A * | 4/1954 | Schwieg, Jr. ............ | G05D 3/14 318/745 |
| 2,728,039 | A * | 12/1955 | Dueringer ............... | G01F 23/38 318/283 |
| 2,924,763 | A * | 2/1960 | Cibelius, Jr. ............. | G05D 3/18 318/750 |
| 3,280,400 | A * | 10/1966 | Roe ........................ | H02K 17/36 310/112 |
| 3,938,030 | A * | 2/1976 | Cornwell .................. | G05F 1/38 323/253 |
| 5,628,252 | A * | 5/1997 | Kuznetsov .............. | B60L 13/10 104/281 |
| 5,686,672 | A * | 11/1997 | Klauber ............... | B60G 17/019 73/114.15 |
| 7,015,664 | B2 * | 3/2006 | Coles ...................... | H02P 6/185 318/400.01 |
| 9,739,844 | B2 * | 8/2017 | Widmer ............. | G01R 33/0047 |

(Continued)

*Primary Examiner* — Gail Kaplan Verbitsky
(74) *Attorney, Agent, or Firm* — Van Pelt, Yi & James LLP

(57) ABSTRACT

A system for measuring temperature in an electric motor includes an interface communicatively coupled to a motor and a processor coupled to the interface. In various embodiments, the processor is configured to obtain access to a temperature-measuring electrical path, where the temperature-measuring electrical path rotates relative to a magnetic field, and the temperature-measuring electrical path has no net induced voltage due to magnetic field as the temperature-measuring electrical path rotates relative to the magnetic field. The processor may be further configured to determine a resistance associated with the temperature-measuring electrical path, and determine a temperature of the motor based at least in part on the resistance.

20 Claims, 16 Drawing Sheets

(56) References Cited

U.S. PATENT DOCUMENTS

| | | | |
|---|---|---|---|
| 2002/0014869 A1* | 2/2002 | Omata | B60L 11/1851 318/139 |
| 2002/0113615 A1* | 8/2002 | Atarashi | B60L 11/1803 318/400.01 |
| 2003/0076068 A1* | 4/2003 | Pollock | H02P 8/14 318/685 |
| 2008/0048604 A1* | 2/2008 | Niemeyer | G05B 19/19 318/628 |
| 2014/0145665 A1* | 5/2014 | Shouji | B60L 15/025 318/503 |
| 2015/0311838 A1* | 10/2015 | Moule | B62D 5/0403 318/400.22 |
| 2016/0285345 A1* | 9/2016 | Adimula | H02K 5/18 |

* cited by examiner

100

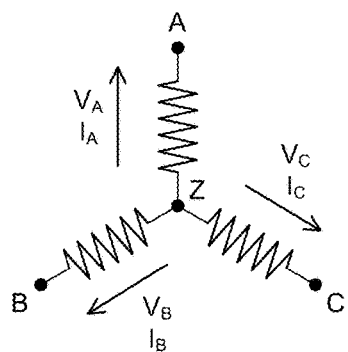
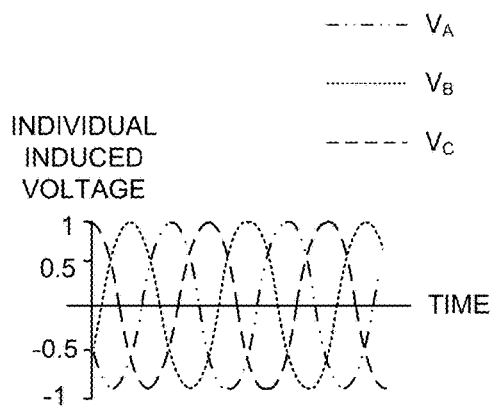
FIG. 3A
FIG. 3B
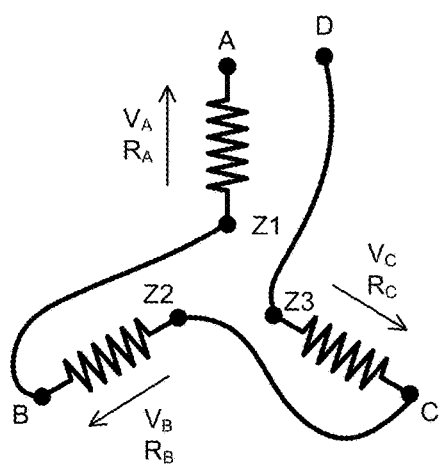
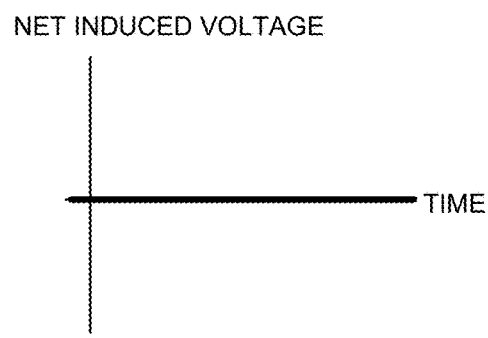
FIG. 4A
FIG. 4B

2300

MEASURING TEMPERATURE IN AN ELECTRIC MOTOR

BACKGROUND OF THE INVENTION

The performance of electric motors is temperature-dependent. For example, if a motor runs too hot, this may cause the windings of the stator in the motor to degrade quickly. In addition, the losses due to heat reduce the efficiency of the motor. Accurately measuring and monitoring the temperature of a motor is important because it may, among other things, help to avoid overheating of the motor. However, motor temperature measurement can be challenging. For example, conventional techniques for measuring the temperature of a motor can be inaccurate. Thus, there is a need for improved means to more accurately measure the temperature of a motor.

BRIEF DESCRIPTION OF THE DRAWINGS

Various embodiments of the invention are disclosed in the following detailed description and the accompanying drawings.

FIG. 3A is a block diagram illustrating an example of a three-phase electric motor before being electrically reconnected to measure temperature.

FIG. 3B is a diagram of voltages induced in the three phases of the electric motor shown in FIG. 3A.

FIG. 4A is a block diagram illustrating an embodiment of a temperature-measuring electrical path in an electric motor.

FIG. 4B is a conceptual diagram of induced voltage in the path shown in FIG. 4A.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 6:
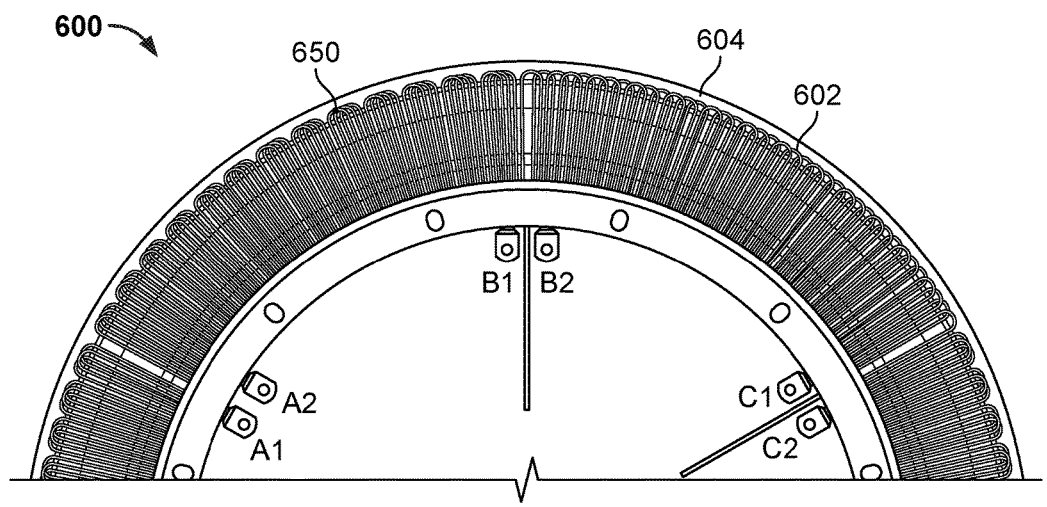
FIG. 6 is a block diagram of an embodiment of a stator in which a temperature-measuring electrical path is provided.

Conventionally, motor temperature is measured by placing probing devices such as resistance temperature detector (RTDs) or thermocouples in various locations of the motor to measure temperature at those specific locations. Referring to FIG. 6, a probe 650 is placed at an end turn of the wiring of a stator to measure temperature at that specific location. An overall temperature of the motor may be determined by taking an average of several temperature measurements. The accuracy of temperature readings depends on, among other things, placing the measuring devices consistently in the same location and good thermal conductivity of the measuring devices. For example, several temperature probes, each of which is intended to be placed at a particular offset relative to a corresponding end turn often are not placed at precisely the same offset relative to its respective end turn due to the small size of wiring or technical challenges in placement of the temperature probe. Moreover, the probing devices may have poor thermal conductivity causing the probing device to make an inaccurate temperature reading. For example, there may be a relatively large difference in temperature between copper and iron on iron core motors and/or between probing devices and copper due to potting).

Embodiments of measuring temperature in an electric motor to measure temperature are described herein. In various embodiments, a method for measuring temperature includes obtaining a temperature-measuring electrical path (sometimes simply called a "path"). The path may be obtained by using an operational path in a motor such as a winding of a stator. Alternatively, the path may be obtained by providing a dedicated path in the motor. In various embodiments, the path rotates relative to a magnetic field. For example, when a motor in which the path is provided is in operation, a structure in which the path is provided rotates relative to a magnetic field. The path is characterized by having no net induced voltage due to the magnetic field as the path rotates relative to the magnetic field. In one aspect, this property (i.e., having no net induced voltage) eliminates noise associated with electrical measurements (e.g., so that a more accurate temperature measurement can be performed). In various embodiments, a resistance associated with the path is determined, and based at least in part on the resistance, a temperature is determined.

The embodiments described herein find application in a variety of settings, including as a stand-alone measurement of motor temperature, to verify temperature measurements made by other methods, and as a calibration test to calibrate other temperature sensors. Temperature may be determined without using existing sensors such as RTDs or thermocouples provided in the motor. The measurements made by existing sensors may be verified by comparing with temperature detected according to the techniques described herein. Existing sensors may be calibrated by comparing temperature measured by the existing sensors with temperature determined according to the techniques described herein. The temperature measurement may be made in real time while a motor is in operation or may be made during a testing or design phase such as at the test bench. The embodiments may be applied to various motors including brushless electric motors with one or more phases.

Figure 1:
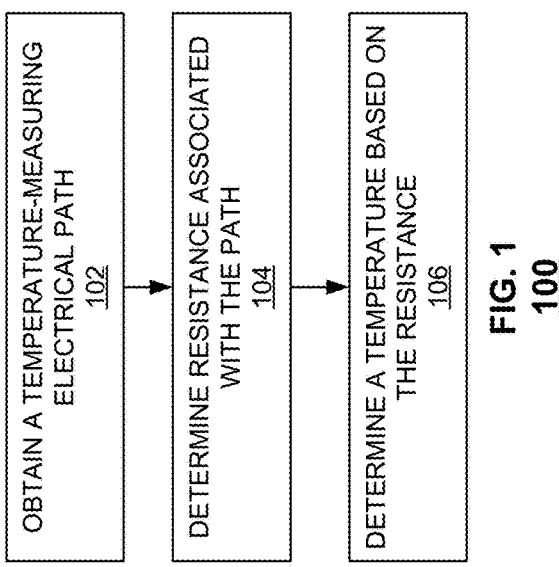
FIG. 1 is a flow chart illustrating an embodiment of a process for measuring temperature in an electric motor.

FIG. 1 is a flow chart illustrating an embodiment of a process for measuring temperature in an electric motor. Process 100 may be implemented by a sensor circuit such as the one shown in FIG. 24. Process 100 may be implemented by a processor such as the one shown in FIG. 23.

Figure 12:
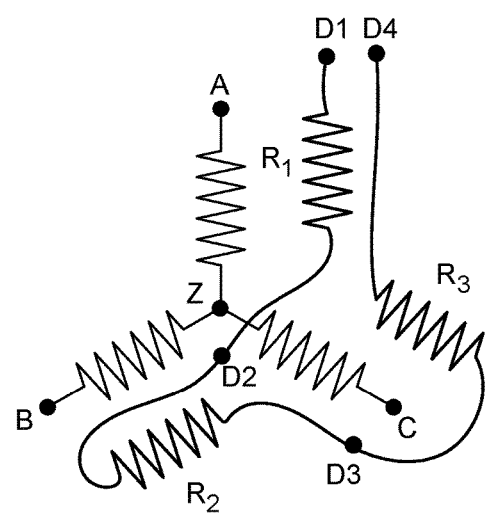
FIG. 12 is a block diagram illustrating an embodiment of a dedicated temperature-measuring electrical path in an electric motor.

In the example shown, the process begins by obtaining a temperature-measuring electrical path (102). The temperature-measuring electrical path is a path formed by wiring in a motor component, the measurement of which yields a temperature of that path. A path may be obtained by connecting a plurality of path portions. In some embodiments, the path is obtained from an operational path in the motor. Referring to FIG. 4A, a temperature-measuring electrical path is obtained from a path comprising the path portion A1 to Z1, the path portion B to Z2, the path portion Z2 to C, and the path portion Z3 to D as shown. In some embodiments, the path is a dedicated path for making measurements. Referring to FIG. 12, a dedicated path (endpoints D1 and D4) parallel to the operational path (endpoints A, B, and C) can be used to make temperature measurements.

In various embodiments, regardless of how the path is obtained, the path is characterized by having no net induced voltage due to a magnetic field in the vicinity of the path, as further described below with respect to FIGS. 2A and 2B. In various embodiments, regardless of how the path is obtained, the path is characterized by an ability to be used to measure temperature for the region of the motor through which the path traverses. In one aspect, this improves the accuracy of temperature measurement by allowing temperature measurement of a region without needing to provide several traditional probing devices (e.g., RTDs or thermocouples) in the motor. As more fully described herein, the path may be included in a stator associated with an electric motor.

Returning to FIG. 1, the process determines resistance associated with the path (104). Depending on the temperature of the path, some level of resistivity will be detected. The resistance of the path may depend on various factors including the material of the path and the temperature of the path. In some embodiments, the resistance is measured when there is no current passing through the operational path such as during a bench test when the motor is not turning. In some embodiments, the resistance is measured when there is current passing through the operational path such as while a motor is in operation and/or turning.

The process determines a temperature based on the resistance (106). The temperature of a material can be determined from its resistivity. For example, copper resistivity increases with temperature. Thus, a larger measured resistance indicates a higher temperature of the copper wire. In some embodiments, a lookup table is used to map resistance to temperature. An example of a specific resistivity relationship to temperature is more fully described with respect to FIG. 18.

Figure 2A:
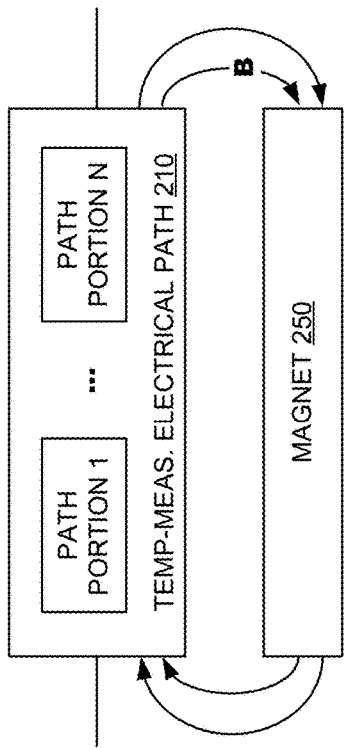
FIG. 2A is a block diagram illustrating an embodiment of a system for measuring temperature in an electric motor.
Figure 2B:
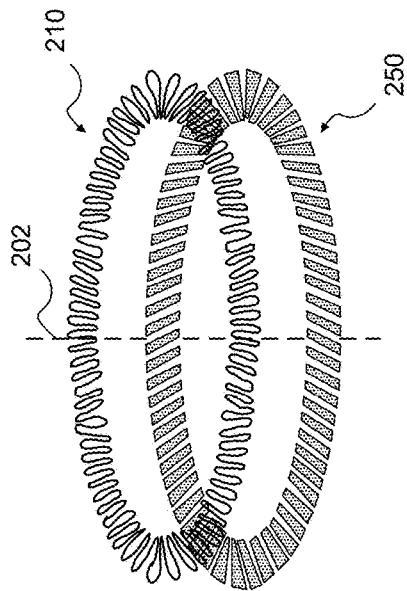
FIG. 2B shows a perspective view of an embodiment of a system for measuring temperature in an electric motor.

FIG. 2A is a block diagram illustrating an embodiment of a system for measuring temperature in an electric motor. The system includes a temperature-measuring electrical path 210 and magnets 250.

The temperature-measuring electrical path (sometimes called "the path") 210 includes one or more path portions, here "Path Portion 1" to "Path Portion N." In some embodiments, the path is formed by rewiring or otherwise electrically reconnected path portions in the electric motor in a different sequence or order where the rewiring results in a temperature-measuring electrical path where there is no net induced voltage due to the rotation of the magnetic field relative to the path. Alternatively, the temperature-measuring electrical path may be a dedicated path that is only used for temperature measurement (e.g., where the dedicated path has no net induced voltage even as the dedicated path and magnetic field rotate relative to each other).

Magnets 250 (which may be a single magnet or several magnets) is a magnetic element provided in the vicinity of the path 210. The magnet 250 may comprise several magnets, for example, forming a magnet array. The magnet may be provided in an electric motor such as a stator. The magnets 250 have an associated magnetic field B as shown. The B-field induces voltages that, in various embodiments, are canceled out by arranging a temperature-measuring electrical path as more fully described herein.

In operation, the temperature-measuring electrical path may rotate relative to the magnet 250, and correspondingly, relative to magnetic field B. FIG. 2B shows a perspective view of an embodiment of a system for measuring temperature in an electric motor. The system includes a temperature-measuring electrical path 210 and a magnet 250.

The path 210 may be provided in a stator of a motor and the magnet 250 may be provided in a rotor of a motor. The rotor rotates relative to the stator about the axis of rotation 202. This rotation of the path 210 with respect to the magnetic field B induces a voltage in the temperature-measuring electrical path which in turn could induce a current flow. However, as is described in more detail below, in some embodiments, path portions (e.g., phases) are rewired in such a way that net or total induced voltage sums to zero.

In various embodiments, path 210 and magnet 250 are adapted to rotate relative to each other. For example, a path (provided in a stator of an electric motor) is stationary while the magnet array 250 (provided in a rotor) rotates about the axis of rotation 202. In various embodiments, the path 210 rotates relative to a magnetic field B. For example, when a motor in which the path is provided is in operation, the magnetic field B rotates relative to a structure in which the path is provided. The rotation of the path relative to the magnet field in some configurations induces a net voltage, as further described with respect to FIGS. 3A and 3B. In embodiments of the present disclosure, the path is characterized by having no net induced voltage due to the magnetic field as the path rotates relative to the magnetic field.

FIG. 3A is a block diagram illustrating an example of a three-phase electric motor before being electrically reconnected to measure temperature. For example, the motor may be rewired to measure temperature. The motor here has a first phase with associated motor lead A, a second phase with associated motor lead B, and a third phase with associated motor lead C. The three phases are coupled at center point Z. When the motor spins, a voltage is generated between the phase leads. The voltage and current of the respective phases are represented by the corresponding arrows shown. By driving current in phase with the voltage through the motor, torque is generated. The motor shown here can also be used as a generator, e.g., if current and voltage are 180 degrees out of phase.

Referring to FIG. 6, which shows an air core motor, the motor leads A, B, C of FIG. 3A (corresponding to A1, A2, B1, B2, C1, and C2 in FIG. 6) are adapted to receive instructions from a controller such as driving signals and to allow sensor measurements such as temperature measurements to be made. A1 of FIG. 6 corresponds to A of FIG. 4A, A2 of FIG. 6 corresponds to Z1 of FIG. 4A, B1 of FIG. 6 corresponds to B of FIG. 4A, B2 of FIG. 6 corresponds to Z2 of FIG. 4A, C1 of FIG. 6 corresponds to C of FIG. 4A, and C2 of FIG. 6 corresponds to Z3 of FIG. 4A. Returning to FIG. 3A, temperature measurements made for the motor in this current configuration is more reliable if there is no net induced voltage. That is, if there is a non-zero net induced voltage, then the resistance measurement is less reliable.

FIG. 3B is a diagram of voltages induced in the three phases of the electric motor shown in FIG. 3A. Each of the voltages through the three phases (i.e., $V_A$, $V_B$, and $V_C$) is sinusoidal where the phases of the three voltage signals are 120° out of phase with each other.

The following figures describe some embodiments where the operational load is reconfigured to form the temperature-measuring electrical path.

FIG. 4A is a block diagram illustrating an embodiment of a temperature-measuring electrical path in an electric motor. The path in this example is obtained by reconnecting (sometimes called "reconfiguring") one or more path portions such that the induced voltage signals cancel out and there is no net induced voltage due to a magnetic field as the path rotates relative to the magnetic field.

In various embodiments, the path is obtained from an operational path without needing a dedicated measuring path. The path may be obtained by reconnecting one or more path portions as follows. A common connection between the path portions is disconnected and the path portions are the connected in series, resulting in the circuit shown in FIG. 4A. Referring to FIG. 3A, a common connection between motor leads A, B, and C is point Z. Common connection Z is disconnected and, turning now to FIG. 4A, a path is formed from point A to point D by connecting point Z1 to B, Z2 to C, and Z3 to D.

FIG. 4B is a conceptual diagram of induced voltage in the path shown in FIG. 4A. The phases in FIG. 4A have been connected such that the total voltage over them is substantially zero. This rewiring causes the three voltage signals $V_A$, $V_B$, and $V_C$ in FIG. 3B to be summed, which results in a net induced voltage signal that is constantly zero. The net induced voltage is plotted over time for the three phase motor shown in FIG. 4A. As shown, the net induced voltage is substantially zero.

Figure 16:
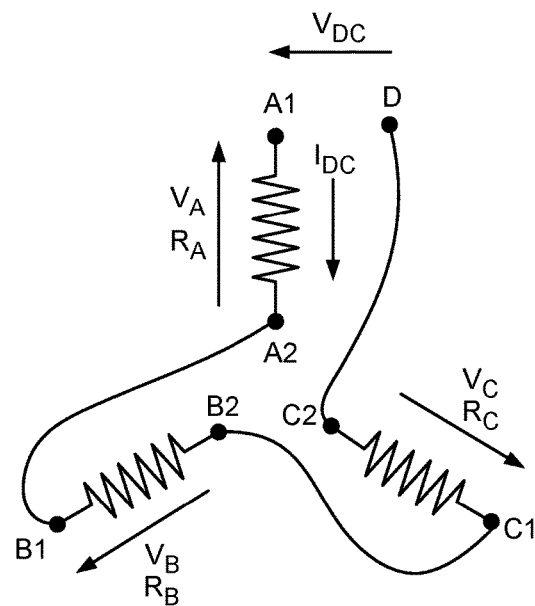
FIG. 16 is a block diagram illustrating an embodiment of a temperature-measuring electrical path in an electric motor for measuring temperature without needing to operate the motor with a controller.
Figure 17:
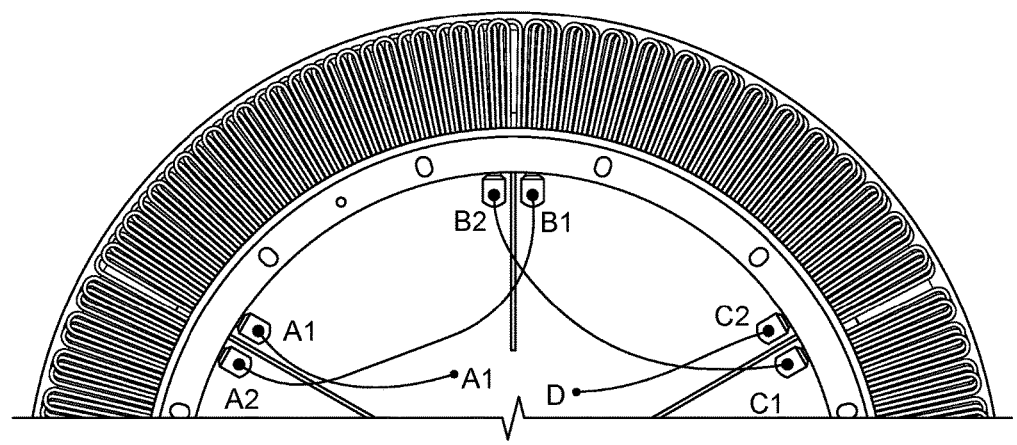
FIG. 17 is a block diagram of an embodiment of a stator of an axial-flux motor in which a temperature-measuring electrical path is provided.
Figure 18:
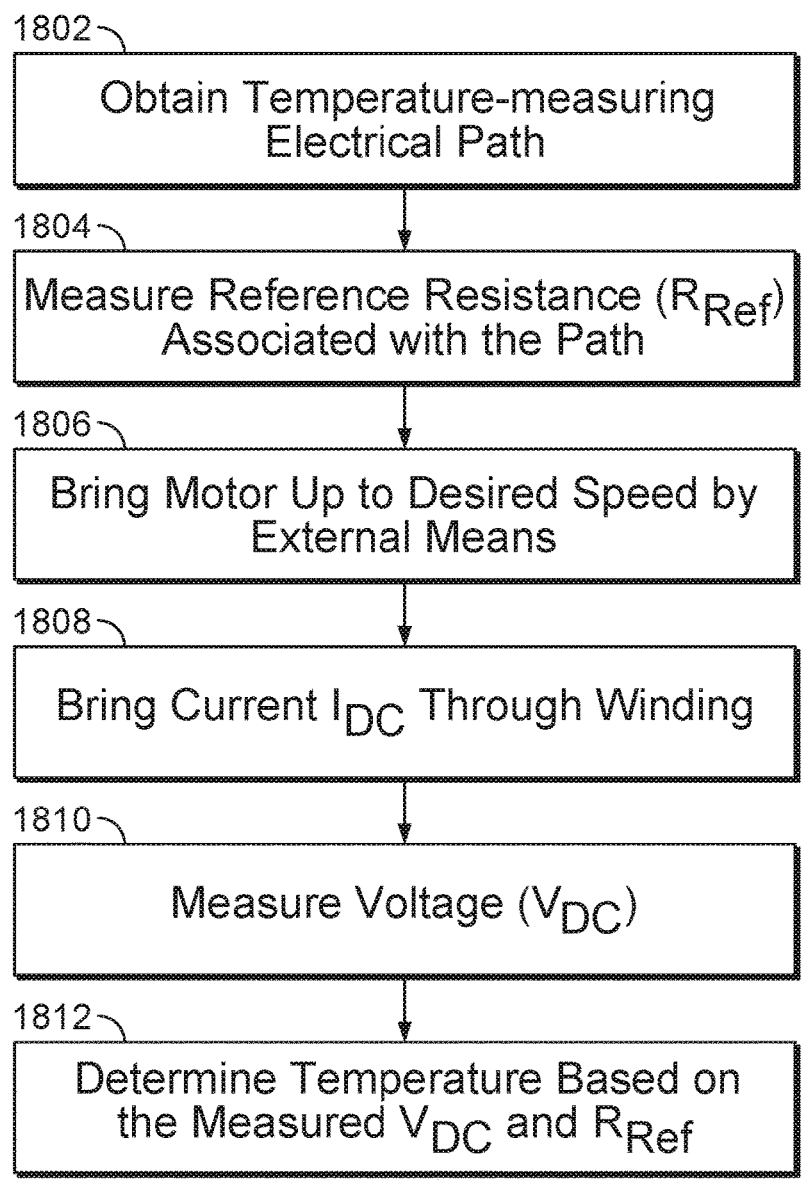
FIG. 18 is a flow chart illustrating an embodiment of a process for performing temperature measurements when a motor controller is unavailable.

The path shown here finds application in a variety of temperature measuring settings including measuring temperature of a motor while the motor is in operation and calibration tests of a motor such as a bench test. An example of a calibration test is shown in FIGS. 16-18.

The techniques described herein find application in a variety of devices such as, without limitation, axial flux motors, radial flux motors, aircore motors, and iron core motors. Correspondingly, the techniques described herein find application in windings that interact a variety of magnets including, without limitation, flat circular magnet arrays and cylindrical magnet arrays. Some of these motors are more fully described herein.

Figure 5:
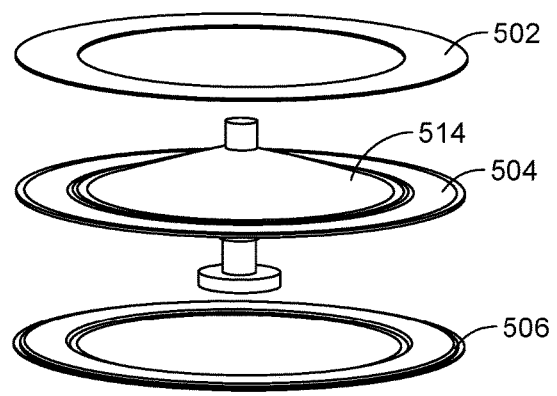
FIG. 5 is a block diagram of an example of an axial-flux motor in which a temperature-measuring electrical path is provided.

FIG. 5 is a block diagram of an example of an axial-flux motor in which a temperature-measuring electrical path is provided. The motor 500 includes upper rotor 502, stator 504, and lower rotor 506.

The upper and lower rotors each may be implemented by a full flat circular array of magnets. The upper magnet array 502 may have substantially all of its magnetic field facing downwards. The lower magnet array 506 may have substantially all of its magnetic field facing upwards. The magnets of the upper and lower rotors produce an alternating magnetic field when current is passed through the stator 504.

The stator 504 may include wire winding such as a three phase Litz wire winding mounted to stator housing 514. In various embodiments, a temperature-measuring electrical path is provided in the winding of the stator by being incorporated into one or more phases of the wire winding, as more fully described with respect to FIGS. 6 and 7. The techniques described herein may be applied to determine a temperature of one or more motor components such as the temperature of the stator 504.

One or more bearings (not shown) controls motion between the upper rotor and the stator and the lower rotor and the stator. Output shafts (not shown) coupled to the upper rotor and/or the lower rotor can transfer torque to drive a load of the motor. The stator housing 514 is depicted as a conical housing provided in the middle of the stator for illustrative purposes. Other types of housings or housing configurations are also possible.

In various embodiments, a magnetic unit comprises at least one rotor and one stator. For example, FIG. 5 shows a single magnetic unit having two rotors and one stator. Several magnetic units may be stacked to form a motor such as the one shown in FIG. 21. A temperature-measuring electrical path may be provided in at least one of the magnetic units to measure temperature for a stacked motor or region of a stacked motor. When assembled, there may be very little space between the two rotors and stators. This makes it difficult to measure the temperature using a probe since there is very little space for the probe to access the interior of the motor. In contrast, the techniques described herein work even if there is very little space between the rotor and stator(s).

FIG. 6 is a block diagram of an embodiment of a stator in which a temperature-measuring electrical path is provided. FIG. 6 shows half of a flat circular stator 600 having a three phase Litz wire winding 602 mounted to backing 604. In various embodiments, the temperature-measuring path is incorporated into the windings as more fully described with respect to FIG. 7. The leads A1, A2, B1, B2, C1, and C2 provide entrance and exit lugs for making measurements and connecting phases. Each phase has a pair of corresponding lugs: lugs A1 and A2 correspond to a first phase A, lugs B1 and B2 correspond to a second phase B, lugs C1 and C2 correspond to a third phase C. Although shown in the interior of the stator in this example, one or more lugs may instead by provided elsewhere in the stator such as at an outer circumference of the stator.

Figure 13A:
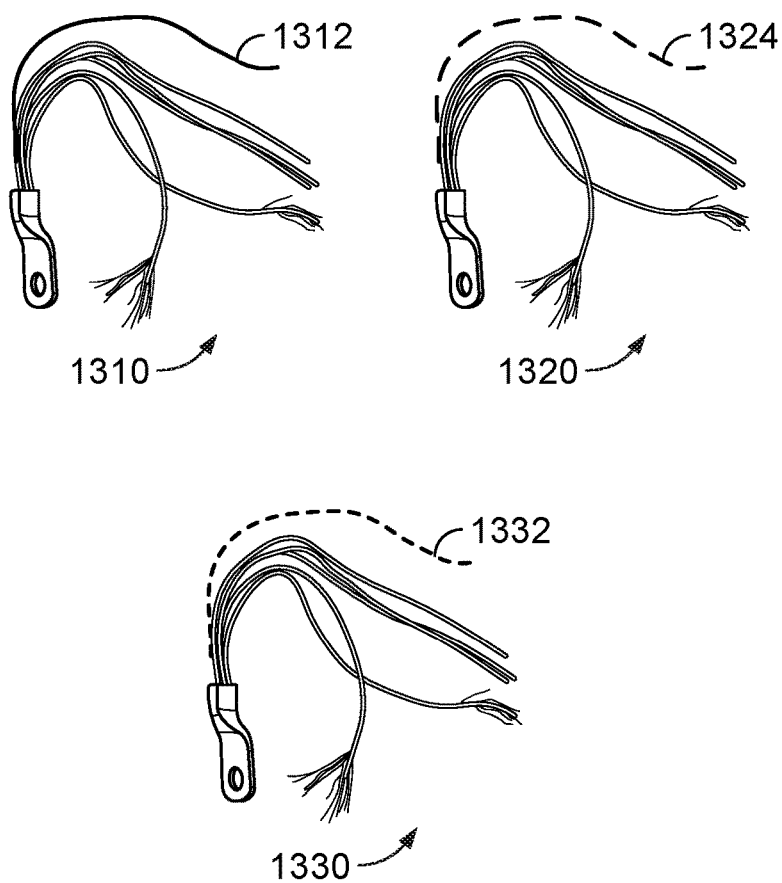
FIG. 13A is a block diagram of an embodiment of bundled wires used to provide a dedicated temperature-measuring electrical path in an electric motor such as the one shown in FIG. 12.

In various embodiments, wiring used for motor windings include a number strands in parallel, called "strands in hand" or "bundle of strands." An example of a bundle of strands is shown in FIG. 13A. Some of the strands in hand may be used for driving the motor (called "motor strands"). The motor strands produce torque due to interaction with a magnetic field of the motor. Some of the strands may be used for measuring temperature (called "temperature-measuring strands").

The temperature-measuring strands may be the same as the motor strand or may be different from the motor strands. In some embodiments, the temperature-measuring strands are made of the same material as the motor strands (e.g., copper). In some embodiments, the temperature-measuring strands differ from the motor strands by material. For example, the temperature-measuring strand is made of a material with a higher temperature coefficient compared with the motor strands (e.g., aluminum).

In some embodiments, the temperature-measuring strands differ from the motor strands by thickness. In various embodiments, the temperature-measuring strand is thicker than the motor strands. This allows the temperature-measuring strand to be easily identified from the finer motor strands. The thickness of the strands may be sized based on expected magnetic fields and frequencies. In various embodiments, the temperature-measuring strand is insulated to accommodate a relatively high voltage differential between the temperature-measuring strands and the motor strands. The amount of insulation provided may be selected based on the voltage of the motor.

In various embodiments, the motor strands are terminated as usual, and the temperature-measuring strands do not interfere with the normal operation of the driving part (e.g., motor strands) of the motor. For example, the motor strands are terminated by separating out the temperature-measuring strands. The motor strands are hot crimped, soldered, or otherwise attached and terminated. The temperature-measuring strands are terminated. The entire stator can then be potted. In various embodiments, the temperature-measuring strands are brought out to a sensing circuit such as the one shown in FIG. 24 to make measurements for temperature determinations as described herein.

Suppose a motor has 400 strands of No. 40 AWG wire. The temperature-measuring strands can be made of No. 30 AWG wire. In this example, this may take away 2.5% to 5% useful torque producing strands. If a motor has more strands, then a lower percentage of useful torque producing strands is taken away. Thus, the incorporation of temperature-measuring strands minimally impacts motor performance, while allowing for accurate temperature measurement.

Figure 7:
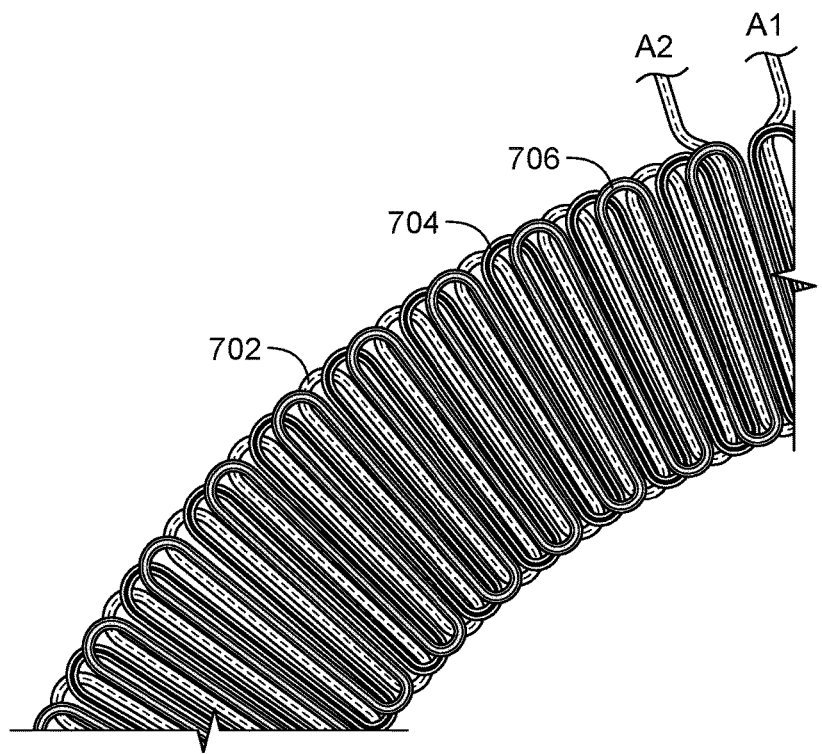
FIG. 7 is a block diagram of an embodiment of windings in which a temperature-measuring electrical path is provided.

FIG. 7 is a block diagram of an embodiment of windings in which a temperature-measuring electrical path is provided. FIG. 7 is a close-up view of the windings of a three-phase stator such as the stator shown in FIG. 6. Each phase is wound around the stator as shown. Here, a first phase 702 is represented by a dashed line, a second phase 704 is represented by a solid line, and a third phase 706 is represented by a white line. Each phase has corresponding entrance and exit lugs. In this example, A2 is the entrance lug for the first phase 702 and A1 is the exit lug for the first phase 702. The entrance and exit lugs may be used to drive a phase (e.g., by connecting a controller such as controller 2310 of FIG. 23 to the lugs,) connecting phases to each other, making measurements, and the like.

In some embodiments, instead of rewiring an operational path to obtain the temperature-measuring electrical path, a dedicated measurement path (e.g., separate from the operational path) is used to measure temperature. The following figures show some examples of this.

Figure 8:
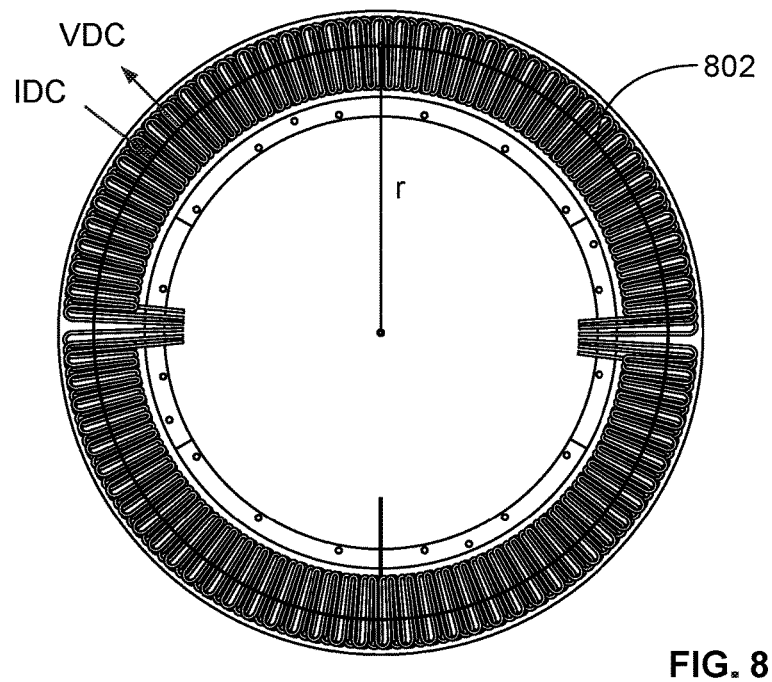
FIG. 8 is a block diagram of an embodiment of a stator in which a temperature-measuring electrical path is provided at a fixed distance or radius from a center of the stator.

FIG. 8 is a block diagram of an embodiment of a stator in which a temperature-measuring electrical path is provided at a fixed distance or radius from a center of the stator. Path 802 is a circular path provided a fixed distance (r) from the center of the stator. Path 802 has the same properties as the other temperature-measuring paths unless otherwise described herein. For example, in various embodiments, induced voltages on path 802 cancel out each other out so that the net induced voltage sums to zero. The path shown in this example is adapted to measure temperature at a fixed distance from the center of the stator. The path may be provided at any fixed distance from the center of the stator including at the end turns. A second path can be provided at a different fixed distance from the center of the stator to measure a radial temperature gradient.

Temperature-measuring strands can be added to the strands in hand, as more fully described with respect to FIG. 12. For example, one strand may be added for measuring three phases simultaneously. Two strands may be added for measuring a single phase (see FIG. 14 for an example). In some embodiments, the temperature-measuring strands are thinner than the motor strands. In some embodiments, the temperature-measuring strands are thicker than the motor strands. When the temperature-measuring strands differ in thickness from motor strands, this provides visual differentiation between the two types of strands. In various embodiments, the temperature-measuring strands are coated with insulation suitable for withstanding the voltage differential between the temperature-measuring strands and the motor strands.

The motor strands can be terminated as usual, e.g., in the same manner as if the temperature-measuring strands are not present. The temperature-measuring strands can be terminated as described above. The whole stator can be potted according to typical techniques. The temperature-measuring strands can be brought out to a sensing circuit such as the one shown in FIG. 24 to make measurements for determining temperature of the motor.

Figure 9:
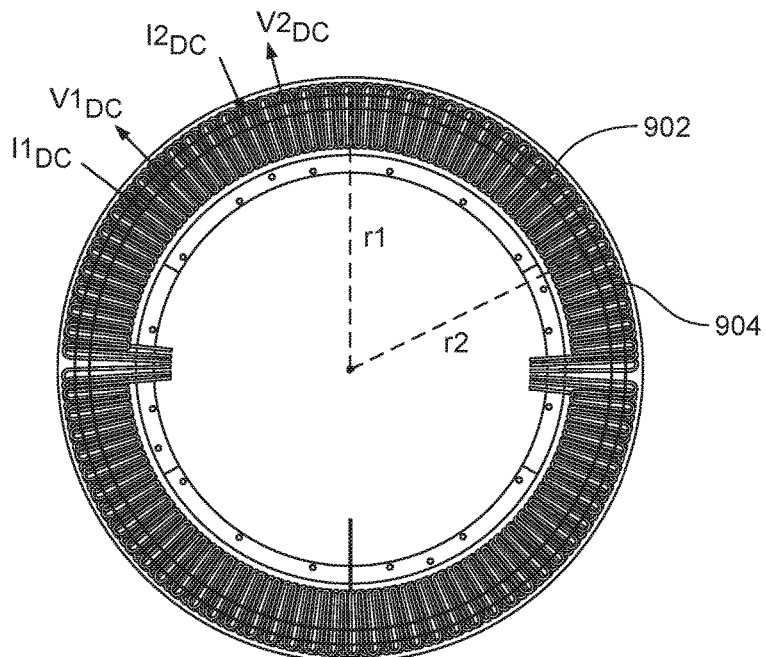
FIG. 9 is a block diagram of an embodiment of a stator in which a plurality of temperature-measuring electrical paths are provided for determining a temperature gradient in the stator.

FIG. 9 is a block diagram of an embodiment of a stator in which a plurality of temperature-measuring electrical paths are provided for determining a temperature gradient in the stator. In this example, a first path 902 is provided a fixed distance (r1) from the center of the stator, and a second path 904 is provided a fixed distance (r2) from the center of the stator as shown. Each path is a dedicated and circular path associated with measuring temperature in connection with that path. A first temperature is determined using the first path 902, and a second temperature is determined using the second path 904. A temperature gradient may be determined using the determined first temperature and second temperature as more fully described with respect to FIG. 10.

A temperature gradient is a measure of temperature variation (if any) on a path extending from the inside of an annular stator (e.g., path 902) to the outside of the annular stator (e.g., path 904). The example shown in FIGS. 8 and 9 are axial flux motors. One or more similar paths may be provided for a radial flux motor to measure temperature at a fixed distance from a center of the radial flux motor.

Figure 10:
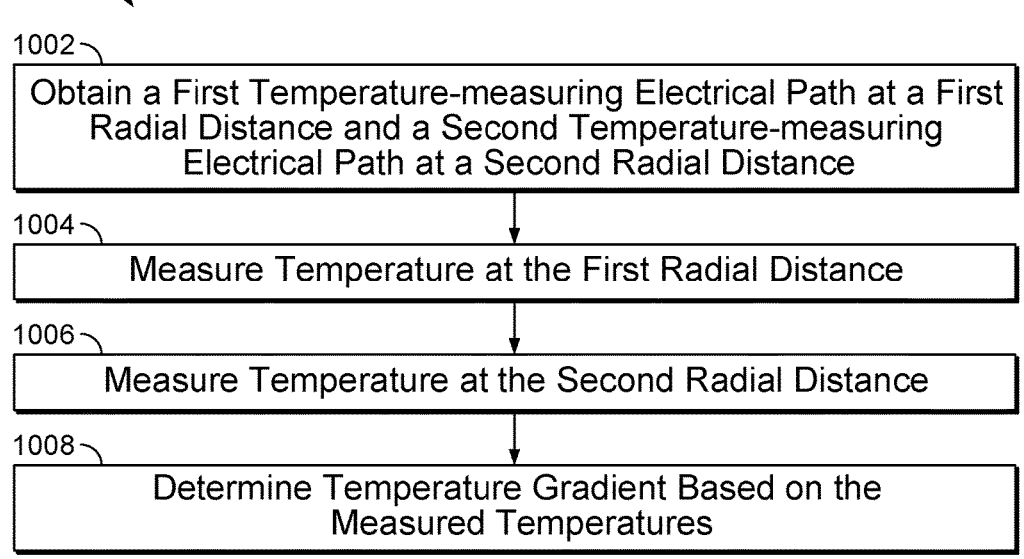
FIG. 10 is a flowchart illustrating an embodiment of a process for measuring a temperature gradient in an electric motor.

FIG. 10 is a flowchart illustrating an embodiment of a process for measuring a temperature gradient in an electric motor. Process 1000 may be implemented by a sensor circuit such as the one shown in FIG. 24 on a motor component such as the stator shown in FIG. 9. Process 1000 may be implemented by a processor such as processor 2312 shown in FIG. 23. Axial flux motors, such as that shown in FIG. 9, tend to be cooler at smaller radius (e.g., near the inner edge) and hotter at larger radii (e.g., near the outer edge) because of the direction of cooling airflow and the resulting temperature gradient may be used to extrapolate the temperature of the hottest part of the motor without having to place a temperature-measuring path at that radii.

The process begins by obtaining a first temperature-measuring electrical path at a first radial distance and a second temperature-measuring electrical path at a second radial distance (1002). Referring to FIG. 9, path 902 shows one example of a first path and path 904 shows an example of a second path. Each of the paths is characterized by having no net induced voltage because the voltages of the paths cancel out.

The process measures temperature at the first radial distance (1004). The temperature measurement at the first radial distance can be made using the first path. Referring to FIG. 9, temperature at a fixed radial distance associated with path 902 is measured. Temperature can be measured according to the processes described herein. For example, a resistance associated with a path is determined based on a measured voltage and known current. The resistance can be used to determine temperature based on the resistivity properties of a material. Referring to FIG. 9, the resistance of path 902 is determined by measuring $V1_{DC}$ when a known current $I1_{DC}$ is passed through the path. The temperature of path 902 may then be determined from the measured resistance based on the material properties. An example of temperature determined based on material properties is further described with respect to FIG. 18.

The process measures temperature at the second radial distance (1006). The temperature measurement at the second radial distance can be made using a second path different from the first path. Referring to FIG. 9, temperature at a fixed radial distance associated with path 904 is measured. Temperature can be measured according to the processes described herein. For example, a resistance associated with a path is determined based on a measured voltage and known current. The resistance can be used to determine temperature based on the resistivity properties of a material. Referring to FIG. 9, the resistance of path 904 is determined by measuring $V2_{DC}$ when a known current $I2_{DC}$ is passed through the path. The temperature of path 904 may then be determined from the measured resistance based on the material properties. An example of temperature determined based on material properties is further described with respect to FIG. 18.

The process determines a temperature gradient based on the measured temperatures (1008). Referring to FIG. 9, a temperature gradient is a measure of temperature variation (if any) on a path extending from the inside of an annular stator (e.g., path 902) to the outside of the annular stator (e.g., path 904). The temperature gradient may be determined by finding the difference between the first measured temperature (1004) and the second measured temperature (1006).

Figure 11:
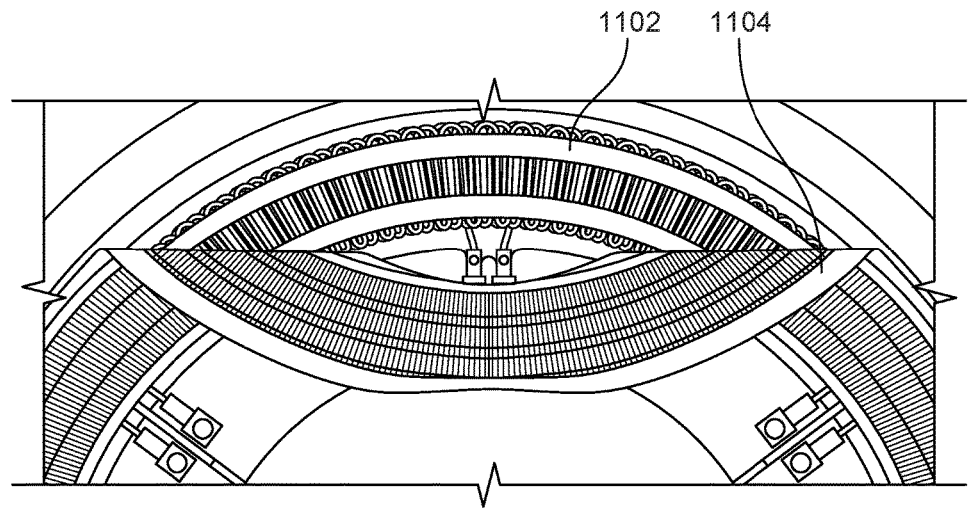
FIG. 11 shows an example of a stator in which a temperature-measuring electrical path is provided at a fixed distance from a center of the stator according to embodiments of the present disclosure.

FIG. 11 shows an example of a stator in which a temperature-measuring electrical path is provided at a fixed distance from a center of the stator according to embodiments of the present disclosure. A portion of the fabric 1104 is lifted to shown the wound phases of the stator. In this example, a path 1102 is incorporated into a structural feature of the stator. As shown, a temperature-measuring strand of a path is provided in the stator at a fixed radial distance by curing the strand with a phasing strip (shown here as the two thick strips on the inner and outer circumferences of the stator).

Some of the preceding figures (e.g., FIG. 8-FIG. 11) show examples where a dedicated path (e.g., separate from the operational load) is used to measure temperature. The following figures illustrate another type of dedicated path for measuring temperature.

FIG. 12 is a block diagram illustrating an embodiment of a dedicated temperature-measuring electrical path in an electric motor. In this example, the path is configured as a dedicated path defined by end points D1 and D4. In various embodiments, the dedicated path includes one or more temperature-measuring strands bundled with one or more motor strands, as more fully described herein with respect to FIG. 7. The motor strands correspond to the windings defined by phases A, B, and C joined at center point Z. The temperature-measuring strand corresponds to the single strand with endpoints D1 and D4. The temperature-measuring strand is a dedicated path for measuring resistance and temperature according to techniques described herein. The measured resistance is $R_1+R_2+R_3$.

FIG. 13A is a block diagram of an embodiment of bundled wires used to provide a dedicated temperature-measuring electrical path in an electric motor such as the one shown in FIG. 12. In this example, bundle of strands 1310 is associated with a first phase, bundle of strands 1320 is associated with a second phase, and bundle of strands 1330 is associated with a third phase. Referring to FIG. 12, first phase strand 1310 is associated with phase A, second phase strand 1320 is associated with phase B, and third phase strand 1330 is associated with phase C. In each bundle 1310, 1320, and 1330, the strands comprise a single phase wire, specifically Litz wire with 400 fine strands. In this example, the bundle includes seven wires. Referring to the example bundle 1310, one of the strands 1312 is dedicated for temperature-measuring. Similarly, strand 1324 in bundle 1320 is dedicated for temperature-measuring and strand 1332 is dedicated for temperature-measuring. Although shown untwisted, the wires may be twisted in various embodiments. Strand 1312 is represented by a solid line, strand 1324 is represented by a line with long dashes, and strand 1332 is represented by a line with short dashes. In these examples, as shown, the dedicated temperature-measuring strands (1312, 1324, 1332) belong to respective bundles but need not terminate at the ring terminal of the respective bundle. In these examples, the terminations correspond to the example shown in FIG. 13B. Each of these strands are arranged and connected in a stator in the manner shown in FIG. 13B.

Figure 13B:
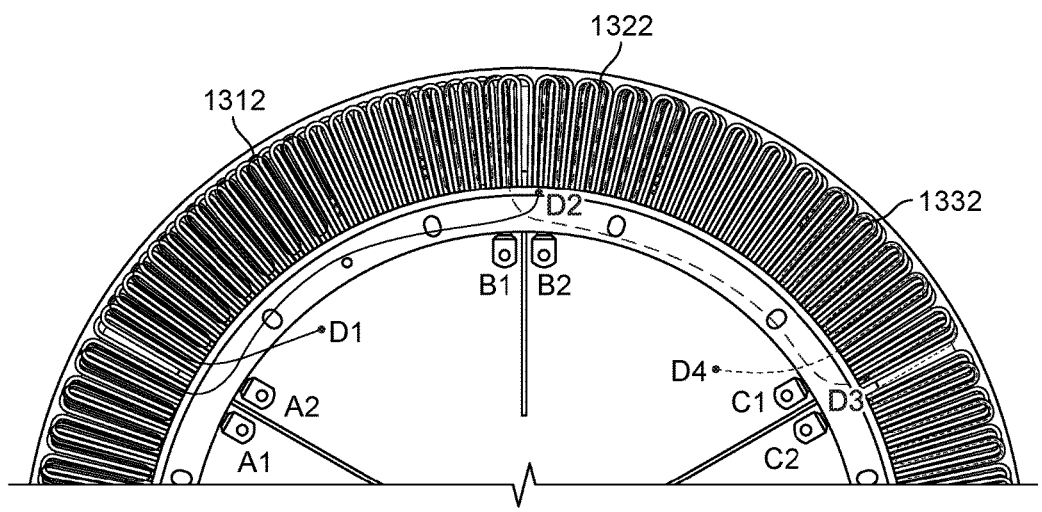
FIG. 13B is a block diagram of an embodiment of a stator of an axial-flux motor in which a dedicated temperature-measuring electrical path is provided.

FIG. 13B is a block diagram of an embodiment of a stator of an axial-flux motor in which a dedicated temperature-measuring electrical path is provided. The points labelled in FIG. 13B correspond to the same points in FIG. 12, and the strands shown in FIG. 13B correspond to the same strands in FIG. 13A. Referring to FIG. 13B, a dedicated temperature-measuring electrical path having substantially no net induced voltage ends in points D1 and D4.

The stator shown in FIG. 13B has three phases wound around the stator. A2 is an entrance lug for a first phase, A1 is an exit lug for the first phase, B2 is an entrance lug for a second phase, B1 is an exit lug for the second phase, C2 is an entrance lug for a third phase, and C1 is an exit lug for the third phase. Each phase can be implemented by a bundle of strands such as those shown in FIG. 13A. For example, the first phase is implemented by bundle 1310, the second phase is implemented by bundle 1320, and the third phase is implemented by bundle 1330. As shown in FIG. 13B, dedicated temperature-measuring strand 1312 (the solid line) is internal to the first phase. Dedicated temperature-measuring strand 1322 (the line with long dashes) is internal to the second phase. Dedicated temperature-measuring strand 1332 (the line with short dashes) is internal to the third phase. For simplicity, only a portion of each of the temperature-measuring strands is shown. The dots at the end of each of the temperature-measuring strands indicate that the strands continue over the entire path all the way around the stator from a respective entrance lug to a respective exit lug.

The temperature-measuring strands 1312, 1322, and 1332 may be coupled as follows. One end of strand 1312 is coupled to one end of strand 1322 (here at point D2). Another end of strand 1322 is coupled to one end of strand 1332 (here at point D3). The other ends of strand 1312 (D1) and strand 1332 (D4) are used for making measurements such as voltage and resistance. The measurements can be used to determine temperature according to the methods described herein such as the one shown in FIG. 1.

The previous figures show a dedicated path passing through three phases of a motor. The following figure shows a dedicated path passing through a single phase of a motor.

Figure 14:
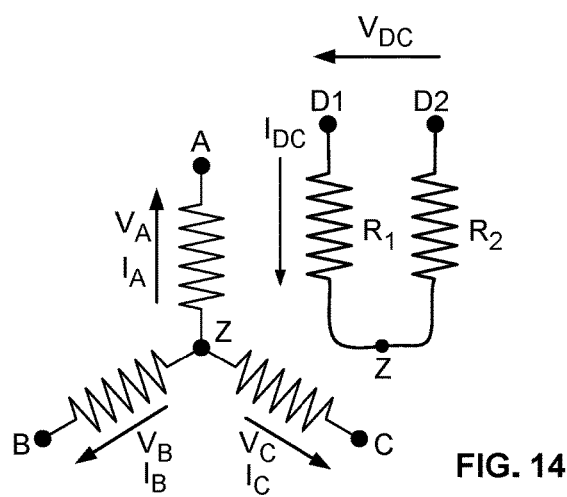
FIG. 14 is a block diagram illustrating an embodiment of a temperature-measuring electrical path in an electric motor adapted to measure a single phase.

FIG. 14 is a block diagram illustrating an embodiment of a temperature-measuring electrical path in an electric motor adapted to measure a single phase. In this example, a dedicated path formed from D1 to D2 is adapted to measure phase A associated with motor lead A.

As more fully described with respect to FIG. 6, wiring for motor windings may include a number of strands, some of which are motor strands and some of which are temperature-measuring strands. In FIG. 14, the motor strands are the windings defined by phases A, B, and C joined at center point Z. The temperature-measuring strands are two single strands with endpoints D1 and D2 tied together close to the center point Z. In this example, the two single strands form a dedicated path for measuring resistance and temperature according to techniques described herein. The measured resistance is $R_1+R_2$. The strands ending in D1 and D2 are configured such that the induced voltages over R1 and R2 cancel each other out.

Figure 15A:
FIG. 15A is a block diagram of an embodiment of bundled wires used in a windings in which a temperature-measuring electrical path is provided.

FIG. 15A is a block diagram of an embodiment of bundled wires used in a windings in which a temperature-measuring electrical path is provided. In this example, the strands comprise a single phase wire, specifically Litz wire with 400 fine strands. In this example, the bundle includes seven bundles of wires. Each of the seven wire bundles pictured each include a number of Litz strands. Two wire bundles 1552 are incorporated into this single phase wire. Although shown untwisted, the wires may be twisted in various embodiments. One advantage of incorporating the sensing wire into a bundle of wires is fill factor. The bundled wires shown here may be used in an air core axial flux motor to measure a single phase.

Figure 15B:
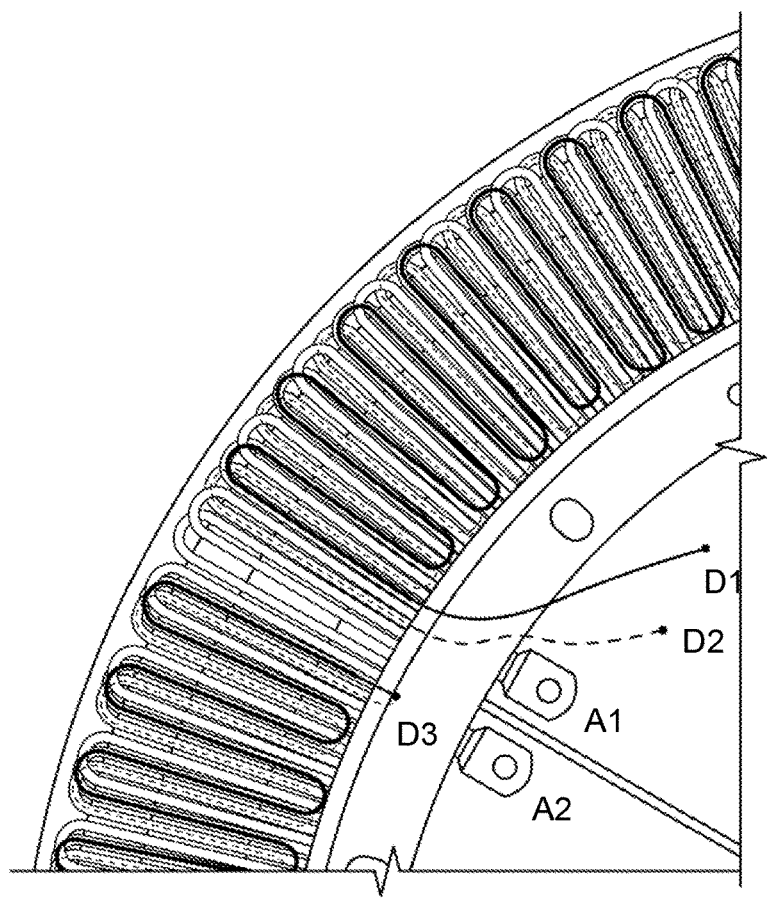
FIG. 15B is a block diagram of an embodiment of a stator of an axial-flux motor in which a temperature-measuring electrical path is provided.

FIG. 15B is a block diagram of an embodiment of a stator of an axial-flux motor in which a temperature-measuring electrical path is provided. A1 is a phase entrance lug and A2 is a phase exit lug. The leads labelled in FIG. 15B correspond to the same points in FIG. 15A. A dedicated temperature-measuring electrical path having substantially no net induced voltage between points D1 and D2.

In this example, a single phase is wound around the stator. The other phases (if any), in various embodiments, are also wound whether or not they also have sensing wires. The single phase has, among other things, two temperature-measuring strands internal to the single phase. The two temperature-measuring strands are shorted to each other on one end at D3. The other ends (D1 and D2) are used for making temperature determinations such as measuring voltage and resistance as described herein. In this example, only a portion of the stator is shown. The sensing wires may be wound all the way around the stator from an entrance lug to an exit lug.

The paths described herein may be used to measure temperature of motors in operation and/or at a testing or calibration phase. For example, where a motor controller is absent, temperature may be determined by bringing up the motor with an external motor, and measuring resistance as more fully described with respect to FIGS. 16-18.

FIG. 16 is a block diagram illustrating an embodiment of a temperature-measuring electrical path in an electric motor for measuring temperature without needing to operate the motor with a controller. For example, the process may be used during bench testing in the event the motor controller has not been developed yet. The temperature-measuring electrical path may be formed in the same way the path in FIG. 4A is formed by disconnecting a center point of the three phases and reconnecting the phases as shown to form a path from point A1 to point D.

FIG. 17 is a block diagram of an embodiment of a stator of an axial-flux motor in which a temperature-measuring electrical path is provided. The leads A1, A2, B1, B2, C1, and C2 provide entrance and exit lugs for connecting wiring and making measurements. The leads labelled in FIG. 17 correspond to the same points in FIG. 16. Coupling the lugs in the manner shown in FIG. 17 provides a temperature-measuring electrical path having substantially no net induced voltage. A1 is the phase entrance lug and A2 is the phase exit lug. As shown, lug A2 is coupled to lug B1, lug B2 is coupled to lug C1, and lug C2 is associated with end D. The ends A1 and D are used for measuring voltage and resistance as further described with respect to FIG. 18.

FIG. 18 is a flow chart illustrating an embodiment of a process for performing temperature measurements when a motor controller is unavailable. The example process may be applied to various different wirings or paths including the embodiments described above.

In the example shown, the process begins by obtaining a temperature-measuring electrical path (1802). The temperature-measuring electrical path is a path formed by wiring in a motor component, the measurement of which yields a temperature of that path. The path may be obtained from wiring of a winding in a motor such as an operational path or a dedicated path in the winding. The path can be obtained by connecting the phases such that voltage over the phases is zero. Referring to FIG. 16, the path is formed from motor lead A1 to motor lead D such that the total voltage ($V_A + V_B + V_C$) over them is zero. An example of obtaining a temperature-measuring electrical path is further described with respect to 102 of FIG. 1.

The process measures a reference resistance ($R_{REF}$) associated with the path (1804). In various embodiments, $R_{REF}$ is a combination of the resistance over each phase ($R_{REF} = R_A + R_B + R_C$) measured at a known ambient temperature. For example, $R_{REF}$ is measured when the motor is not in operation. By obtaining $R_{REF}$, resistance at other temperatures may be derived because the resistivity of a material is related to its resistance. For example, copper resistivity at a temperature T is given by equation (1), where $R_{REF}$ is the reference resistance, a is a material-dependent value, and $T_{REF}$ is the reference temperature at which $R_{REF}$ is measured.

$$R(T) = R_{REF}(1 + \alpha(T - T_{REF})) \quad (1)$$

The process brings the motor up to a desired speed by external means (1806). The motor may be driven by an external motor. For example, an array of magnets in the electric motor is rotated using an external motor. Bringing up the motor to a desired speed by external means allows temperature bench tests.

The process brings a current ($I_{DC}$) through winding (1808). In various embodiments, the current is used to heat up the motor. The current can be picked to reach a desired temperature or to mimic a desired operational AC current. The stator absorbs the generated heat, e.g., $(R_A(T) + R_B(T) + R_C(T)) * I_{DC}^2$. The winding, as described earlier, may be wiring of the motor in which the temperature-measuring electrical path is obtained. When $I_{DC}$ is passed through the winding, the current also passes through the path. In various embodiments, applying a DC signal ($I_{DC}$) heats up the motor, causing an increase in $V_{DC}$. The increase in $V_{DC}$ can be measured to calculate temperature as more fully described below.

The process measures voltage ($V_{DC}$) (1810). When $I_{DC}$ is applied, $V_{DC}$ increases. The measured resistance is related to the rise in $V_{DC}$ for a fixed $I_{DC}$ to temperature change.

The process determines temperature based on the measured $V_{DC}$ and $R_{REF}$ (1812). More specifically, temperature can be determined from $V_{DC}$, $R_{REF}$, and $I_{DC}$ using the known resistivity of a material at a reference temperature. Using the resistivity of copper (see equation (1)), temperature is given by equation (2), where a is a material-dependent value, and $T_{REF}$ is the reference temperature at which $R_{REF}$ is measured. The current and the voltage may be used to obtain the resistance associated with the temperature-measuring path. That is, $R(T) = V_{DC}/I_{DC}$.

$$T = \frac{\frac{R(T)}{R_{REF}} - 1}{\alpha} + T_{REF} \quad (2)$$

In some embodiments, temperature calibration may be performed by comparing the temperature obtained at 1812 with other temperatures measured by other devices such as RTDs and thermocouples which are (re)calibrated, if/as needed.

Figure 19:
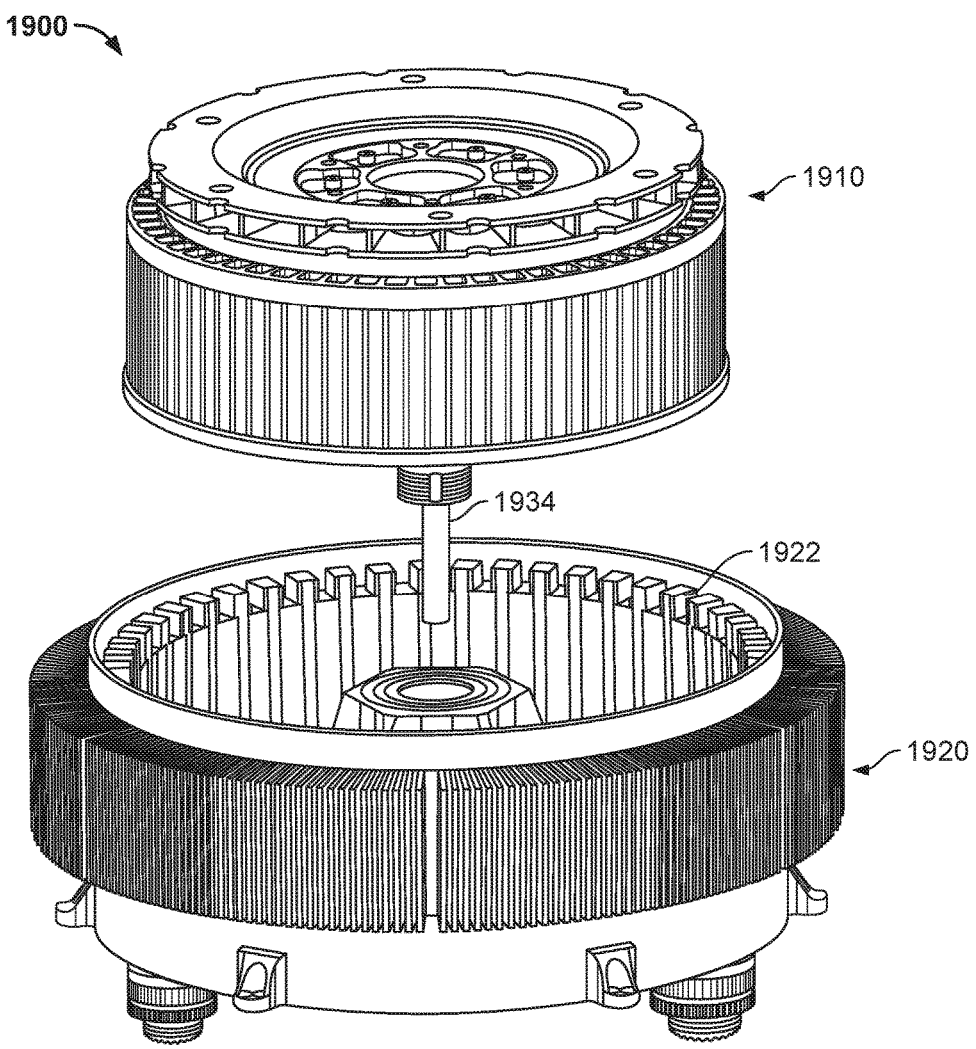
FIG. 19 is a block diagram illustrating an embodiment of a radial-flux motor in which a temperature-measuring electrical path is provided.

FIG. 19 is a block diagram illustrating an embodiment of a radial-flux motor in which a temperature-measuring electrical path is provided. The motor 1900 includes rotor 1910 and stator 1920.

The stator 1920 may include wire winding along the circumference of stator 1920. The winding may run up and down along the inner wall of the cylindrical outer housing such that end points 1922 are positioned as shown. In various embodiments, a temperature-measuring electrical path is provided in the winding of the stator, as described herein. The techniques described herein may be applied to determine a temperature of one or more motor components such as the temperature of the stator 1920.

The rotor 1910 includes a cylindrical array of magnets. The magnets are arranged along the inner wall of the cylindrical outer housing of the rotor. The magnets of the stator produce a magnetic field when current is passed through the stator.

Figure 20:
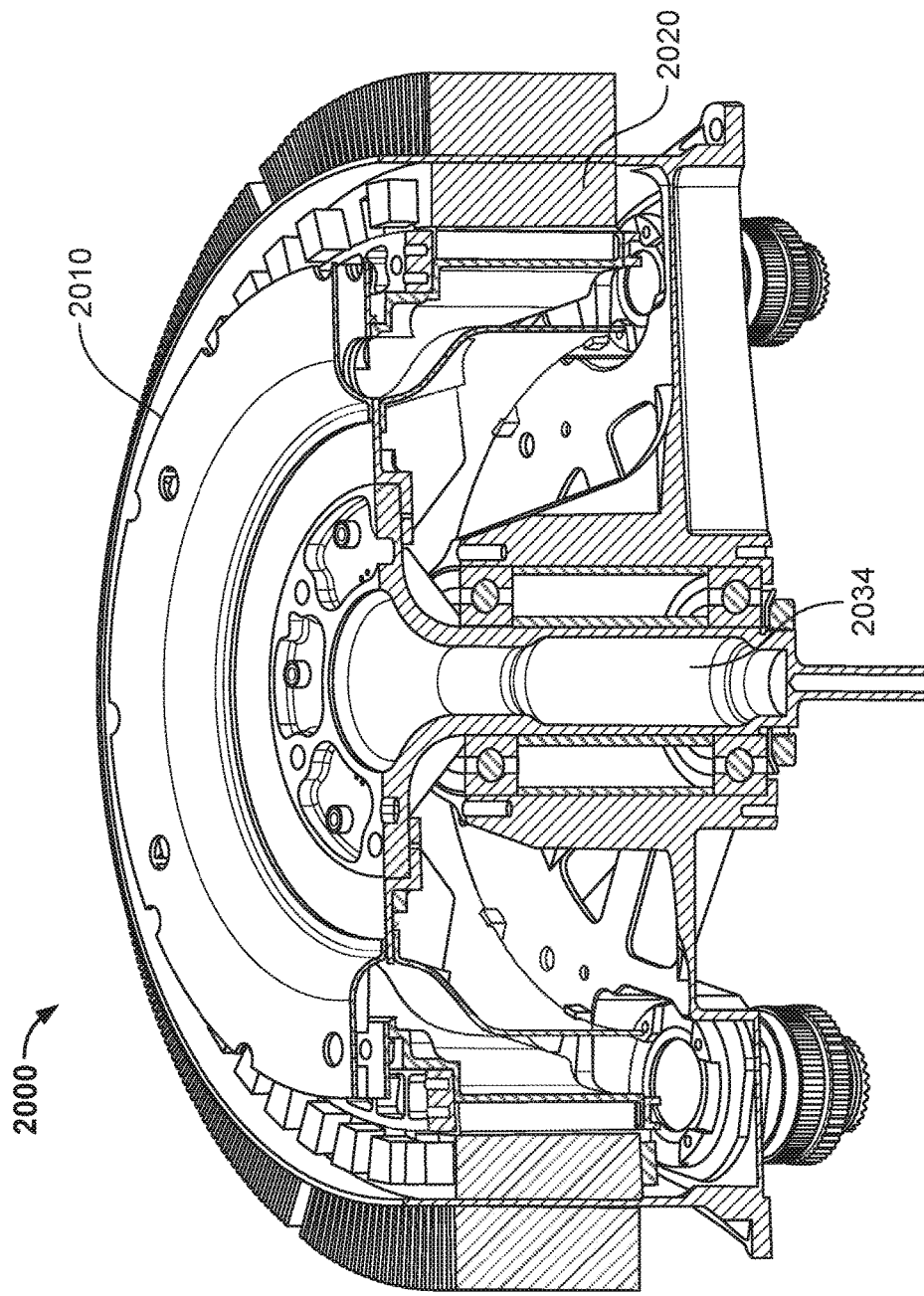
FIG. 20 is a block diagram illustrating an embodiment of a radial-flux motor in which a temperature-measuring electrical path is provided.

In this example, the rotor includes an output shaft 1934 is adapted to accept a stator component to allow the rotor and stator to be coupled as shown in FIG. 20. When the motor is driven, e.g., current is passed through the windings 1922 of the stator 1920, the rotor 1910 rotates relative to the stator 1920 to produce torque. The output shaft 1934 allows torque to be transferred to drive a load of the motor.

FIG. 20 is a block diagram illustrating an embodiment of a radial-flux motor in which a temperature-measuring electrical path is provided. The motor 2000 includes rotor 2010 and stator 2020. The rotor and stator are coupled via shaft 2034. The rotor 2010 includes a magnet array. Each of the components shown are like the corresponding ones in FIG. 19 unless otherwise described herein.

Temperature-measuring strands can be added to the strands in hand, as more fully described with respect to FIG. 6. For example, one strand may be added for measuring three phases simultaneously. Two strands may be added for measuring a single phase (see FIG. 14 for an example). In some embodiments, the temperature-measuring strands are thinner than the motor strands. In some embodiments, the temperature-measuring strands are thicker than the motor strands. When the temperature-measuring strands differ in thickness from motor strands, this provides visual differentiation between the two types of strands. In various embodiments, the temperature-measuring strands are coated with insulation suitable for withstanding the voltage differential between the temperature-measuring strands and the motor strands.

The motor strands can be terminated as usual, e.g., in the same manner as if the temperature-measuring strands are not present. The temperature-measuring strands can be terminated as described above. The whole stator can be potted according to typical techniques. The temperature-measuring strands can be brought out to a sensing circuit such as the one shown in FIG. 24 to make measurements for determining temperature of the motor.

Figure 21:
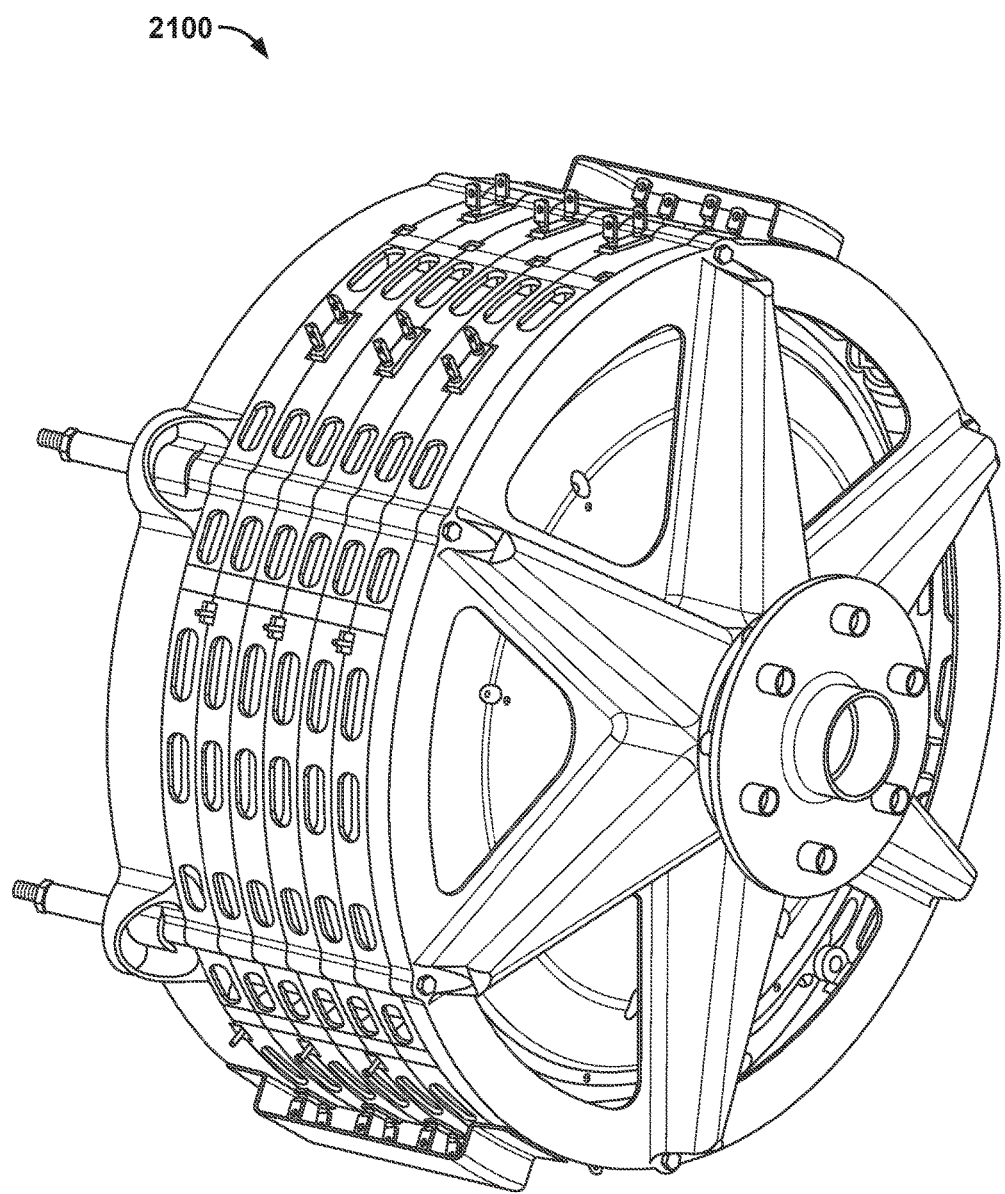
FIG. 21 is a block diagram illustrating an embodiment of a stacked motor in which a temperature-measuring electrical path is provided.

FIG. 21 is a block diagram illustrating an embodiment of a stacked motor in which a temperature-measuring electrical path is provided. Motor 2100 is a multi-stack motor with six magnetic units. In this example, each of the magnetic units is implemented by an axial-flux motor such as the one shown in FIG. 5. Each of the magnetic units is adapted to generate torque when the unit's magnetic field interacts with its winding currents. One or more of the magnetic units may have a temperature-measuring electrical path adapted to measure temperature of the respective magnetic unit according to the temperature measurement techniques more fully described herein. Temperature measurements may indicate issues such as one part of the motor being heated more than another part of the motor.

Figure 22:
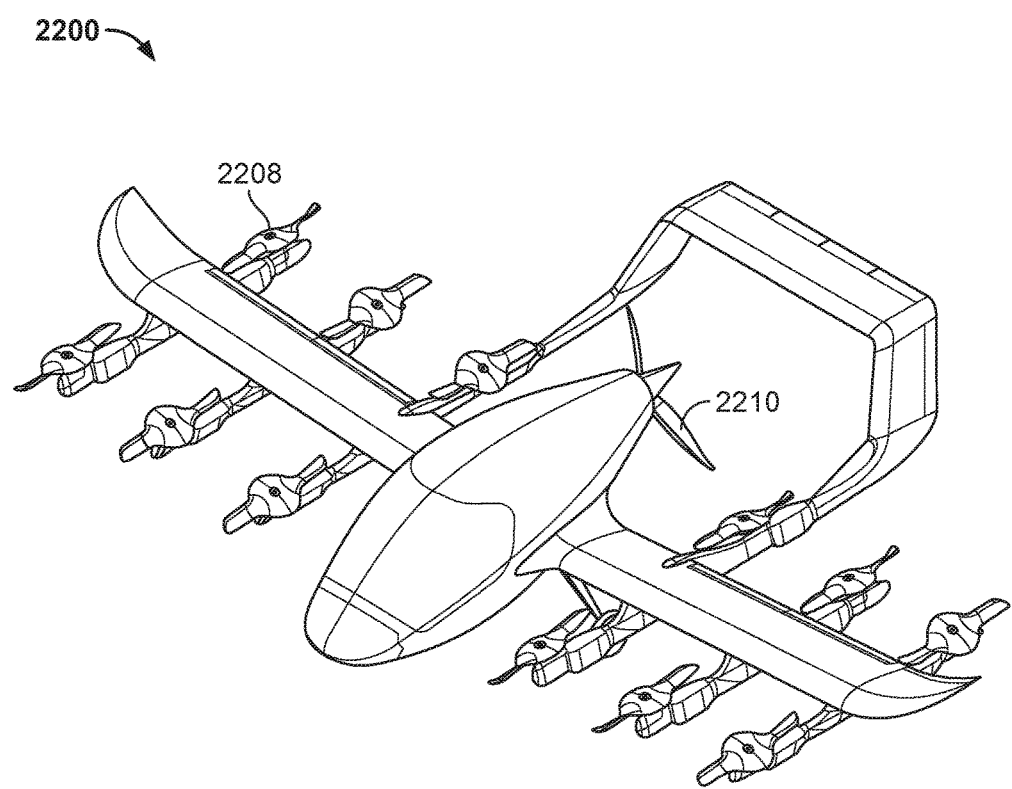
FIG. 22 is a block diagram illustrating an aircraft having motors with temperature-measuring electrical paths.

FIG. 22 is a block diagram illustrating an aircraft having motors with temperature-measuring electrical paths. Aircraft 2200 is a multicopter whose motor temperatures can be measured using the temperature-measuring electrical paths. Temperature can be measured for a forward propulsion system 2210 and/or a vertical propulsion system 2208.

In the example shown, the multicopter 2200 has two propulsion systems: a forward propulsion system 2210 and a vertical propulsion system 2208. The forward propulsion system 2210 is used to propel the multicopter forward along a longitudinal (roll) axis. As shown here, the blades of the lift fans in the forward propulsion system 2210 are oriented to rotate in a vertical plane.

The forward propulsion system 2210 produces lift to keep the aircraft airborne in a manner similar to a fixed wing aircraft (e.g., where the forward propulsion of the multicopter causes airflow over and under the wings which in turn induces an aerodynamic force upwards on the bottom of the wings). In the exemplary multicopter, the fans of the forward propulsion system are implemented using modular motors (various embodiments of which are described herein).

In the vertical propulsion system 2208, the blades of the lift fans are oriented to rotate in a horizontal plane. The vertical propulsion system is used to move (e.g., up or down) the aircraft along a vertical (yaw) axis. The vertical propulsion system produces lift in a manner similar to helicopters where the lift is produced by the airflow downwards.

In various embodiments, the shapes and/or pitch angles of the blades in the forward propulsion system 2210 and vertical population system may be optimized for the specific type of flying (e.g., forward flight versus vertical flight).

While the multicopter is flying, one of the propulsion systems may be turned off (if desired) while the other propulsion system remains on. For example, if the multicopter 2200 is flying forward at a constant altitude, then the vertical propulsion system may be turned off to conserve power and/or because the forward propulsion system 2210 is more efficient at flying in this manner. Or, if the multicopter is hovering in-air at a constant position, the forward propulsion system 2210 may be turned off.

Figure 23:
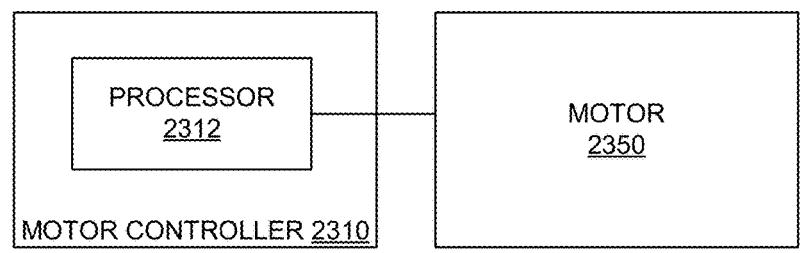
FIG. 23 is a block diagram of a controller configured to measure temperature of a motor.

FIG. 23 is a block diagram of a controller configured to measure temperature of a motor. In this example, motor controller 2310 (sometimes called "controller") is adapted to control motor 2350. The controller includes a processor 2312 that can be programmed to carry out the methods described herein. For example, processor 2312 is configured to instruct voltage, resistance, and other measurements to be made using the temperature-measuring strands in the motor.

Processor 2312 may be implemented by at least one microprocessor subsystem (also referred to as a processor or a central processing unit (CPU)). For example, processor 2312 can be implemented by a single-chip processor or by multiple processors. In some embodiments, processor 2312 is a general purpose digital processor that controls the operation of the motor 2350. In some embodiments, processor 2312 also includes one or more coprocessors or special purpose processors (e.g., a graphics processor, a network processor, etc.). Using instructions retrieved from memory, processor 2312 controls the reception and manipulation of data such as voltage, resistance, and other measurements to calculate temperature of motor 2350.

Figure 24:
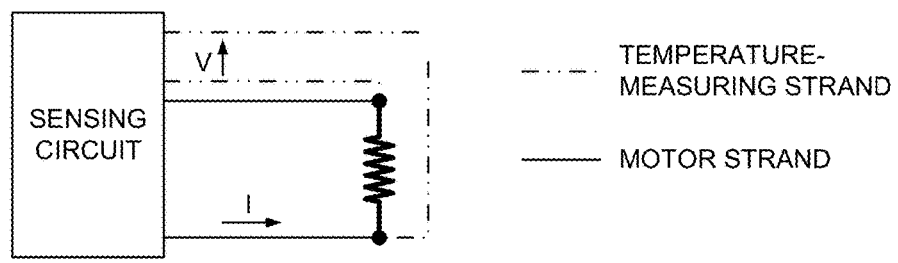
FIG. 24 is a block diagram of a sensor circuit configured to measure temperature of a motor.

FIG. 24 is a block diagram of a sensor circuit configured to measure temperature of a motor. Voltage of a phase can be measured using the sensing circuit shown. In this example, the sensing circuit is a four wire sensing circuit. Current passed to the phase via the pair of motor strands (solid line). Voltage is measured using the pair of temperature-measuring strands (dashed line). For example, the voltage difference across the phase can be measured using the temperature-measuring strands.

In contrast to conventional motor temperature measurement techniques, the temperature measurement embodiments described herein are more accurate. In one aspect, various embodiments measure temperature over an area, specifically the area in which the temperature-measuring electrical path is provided. This allows an average temperature for that region to be measured instead of temperature at a specific spot where a thermocouple is provided.

In various embodiments, rotor imbalances may be detected. For example, rotor imbalances may cause voltage fluctuations, which may be detected according to the temperature measurements described herein. For example, the voltages would no longer perfectly cancel each other out, so there would be an AC component to the detected voltage.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system comprising:
  an interface communicatively coupled to a motor and configured to receive measurements from the motor including voltage measurements, wherein a temperature-measuring electrical path is provided on at least a portion of the motor, a portion of the motor produces a magnetic field that rotates relative to the temperature-measuring electrical path, and path portions of the temperature-measuring electrical path are arranged to cancel out voltages induced due to the rotating magnetic field; and
  a processor configured to:
    determine a resistance of the temperature-measuring electrical path based at least in part on the received measurements;
    determine a temperature of the motor based at least in part on the resistance; and
    output the determined temperature.
2. The system of claim 1, wherein:
  the motor includes an electric motor, and
  the temperature-measuring electrical path is included in a stator associated with an electric motor.

3. The system of claim 1, wherein the motor is one of the following motor types: an iron core motor, an aircore motor, an axial flux motor, or a radial flux motor.

4. The system of claim 1, wherein
the motor includes a three-phase electric motor, and
the temperature-measuring electrical path is included in the three-phase electric motor and is obtained by respective temperature-measuring strands in each of phase of the three-phase electric motor.

5. The system of claim 1, wherein:
the motor includes an axial flux motor;
the temperature-measuring electrical path is included in a stator associated with the axial flux motor; and
the axial flux motor further includes a flat circular array of magnets which produces the magnetic field.

6. The system of claim 1, wherein:
the motor includes an axial flux motor;
the temperature-measuring electrical path is included in a stator associated with a radial flux motor; and
the radial flux motor further includes a cylindrical array of magnets which produces the magnetic field.

7. A method of producing a stator comprising:
forming a stator winding by providing at least one temperature-measuring strand; and
arranging the at least one temperature-measuring strand in a temperature-measuring electrical path, wherein a magnetic field of a motor in which the stator is provided rotates relative to the temperature-measuring electrical path and path portions of the temperature-measuring electrical path are arranged to cancel out voltages induced due to the magnetic field as the rotating magnetic field rotates;
wherein at least one temperature-measuring strand is used to measure a resistance of the temperature-measuring electrical path to determine a temperature of the stator based at least in part on the resistance.

8. The system of claim 1, wherein the temperature-measuring electrical path includes a dedicated path associated with measuring temperature, wherein the dedicated path is different from a motor-driving path in the motor.

9. The system of claim 1, wherein:
the temperature-measuring electrical path includes a dedicated path associated with measuring temperature, wherein the dedicated path is different from a motor-driving path in the motor;
the dedicated path includes one or more temperature-measuring strands which are bundled with one or more motor strands, the one or more motor strands configured to produce torque.

10. The system of claim 9, wherein the temperature-measuring strands are made from a different material than the one or more motor strands.

11. The system of claim 9, wherein the temperature-measuring strands are a different thickness compared with the one or more motor strands.

12. The system of claim 1, wherein:
the motor includes an electric motor, and
the temperature-measuring electrical path includes a dedicated path associated with measuring temperature of a single phase of the electric motor.

13. The system of claim 1, wherein:
the motor includes an electric motor;
the temperature-measuring electrical path is included in a stator associated with the electric motor; and
the determination of the resistance associated with the temperature-measuring electrical path includes:
outputting instructions to rotate an array of magnets in the electric motor using an external motor and pass a direct current (DC) signal through the temperature-measuring electrical path;
receiving a current measurement and a voltage measurement associated with the DC signal; and
calculating the resistance of the temperature-measuring electrical path based at least in part on the current and the voltage associated with the DC signal.

14. The system of claim 1, wherein:
the temperature-measuring electrical path includes a first dedicated and circular path associated with measuring temperature such that the determined temperature is associated with the first dedicated and circular path; and
the processor is further configured to:
determining a second temperature using a second dedicated and circular path associated with measuring temperature such that the second determined temperature is associated with the second dedicated and circular path; and
determining a temperature gradient using the determined temperature associated with the first dedicated and circular path and the second determined temperature associated with the second dedicated and circular path.

15. The system of claim 1, wherein
the motor includes an electric motor, and
the temperature-measuring electrical path includes a dedicated and circular path associated with measuring temperature at a fixed radial distance from a center of a stator of the electric motor.

16. The system of claim 1, further comprising detecting a rotor imbalance based at least in part on a voltage determined based on the determined resistance.

17. The method of claim 7, wherein
the arranging the at least one temperature measuring strand includes electrically reconnecting a plurality of path portions of an operational path in the stator.

18. The method of claim 7, wherein:
the arranging the at least one temperature measuring strand includes electrically reconnecting a plurality of path portions of an operational path in the stator including by:
electrically disconnecting a common connection between the plurality of path portions; and
electrically connecting the plurality of path portions in series.

19. A method comprising:
receiving, by a communications interface coupled to a motor, measurements from the motor including voltage measurements wherein a temperature-measuring electrical path is provided on at least a portion of the motor a portion of the motor produces a magnetic field that rotates relative to the temperature-measuring electrical path, and path portions of the temperature-measuring electrical path are arranged to cancel out voltages induced due to the rotating magnetic field rotates;
determining, by a processor, a resistance of the temperature-measuring electrical path based at least in part on the received measurements;
determining, by the processor a temperature of the motor based at least in part on the resistance; and
outputting the determined temperature.

20. A computer program product embodied in a non-transitory computer readable storage medium and comprising computer instructions for:

receiving measurements from a motor including voltage measurements wherein a temperature-measuring electrical path is provided on at least a portion of the motor, a portion of the motor produces a magnetic field that rotates relative to the temperature-measuring electrical path, and path portions of the temperature-measuring electrical path are arranged to cancel out voltages induced due to the magnetic field as the rotating magnetic field rotates;

determining a resistance of the temperature-measuring electrical path based at least in part on the received measurements;

determining a temperature of a motor based at least in part on the resistance; and outputting the determined temperature.

* * * * *

UNITED STATES PATENT AND TRADEMARK OFFICE
CERTIFICATE OF CORRECTION

PATENT NO. : 10,209,137 B1
APPLICATION NO. : 15/853387
DATED : February 19, 2019
INVENTOR(S) : Diederik Marius Page 1 of 1

It is certified that error appears in the above-identified patent and that said Letters Patent is hereby corrected as shown below:

In the Specification

Column 13, Line 35, after "resistance,", delete "a" and insert --α--, therefor.

Column 13, Line 67, after "where", delete "a" and insert --α--, therefor.

In the Claims

Column 18, Claim 19, Line 52, after "measurements", insert --,--.

Column 18, Claim 19, Line 53, after "motor", insert --,--.

Column 19, Claim 20, Line 2, after "measurements", insert --,--.

Signed and Sealed this
Third Day of September, 2019

Andrei Iancu
*Director of the United States Patent and Trademark Office*